US012423518B2

(12) United States Patent
Anil et al.

(10) Patent No.: US 12,423,518 B2
(45) Date of Patent: Sep. 23, 2025

(54) ATTENTION NEURAL NETWORKS WITH N-GRAMMER LAYERS

(71) Applicant: Google LLC, Mountain View, CA (US)

(72) Inventors: Rohan Anil, San Francisco, CA (US); Aurko Roy, San Francisco, CA (US)

(73) Assignee: Google LLC, Mountain View, CA (US)

( * ) Notice: Subject to any disclaimer, the term of this patent is extended or adjusted under 35 U.S.C. 154(b) by 586 days.

(21) Appl. No.: 17/903,805

(22) Filed: Sep. 6, 2022

(65) Prior Publication Data
US 2024/0078379 A1   Mar. 7, 2024

(51) Int. Cl.
*G06F 40/20* (2020.01)
*G06N 3/04* (2023.01)

(52) U.S. Cl.
CPC ............... *G06F 40/20* (2020.01); *G06N 3/04* (2013.01)

(58) Field of Classification Search
CPC .......... G06F 40/20; G06F 40/30; G06F 40/40; G06F 40/284; G06N 3/04; G06N 3/045
USPC ............................................................ 704/9
See application file for complete search history.

(56) References Cited

U.S. PATENT DOCUMENTS

| | | | | |
|---|---|---|---|---|
| 8,725,509 B1 * | 5/2014 | Harb | ...................... | G10L 15/183 704/10 |
| 11,373,086 B2 * | 6/2022 | Strope | ...................... | H04L 51/02 |
| 2005/0276235 A1 * | 12/2005 | Lee | .......................... | G10L 19/04 704/E19.023 |
| 2007/0078653 A1 * | 4/2007 | Olsen | ...................... | G10L 15/197 704/240 |
| 2018/0240014 A1 * | 8/2018 | Strope | ...................... | G06N 3/084 |
| 2020/0175961 A1 * | 6/2020 | Thomson | ................ | G10L 15/28 |

(Continued)

FOREIGN PATENT DOCUMENTS

| | | | |
|---|---|---|---|
| JP | 2017032738 A * | 2/2017 | |
| WO | WO-2018152345 A1 * | 8/2018 | ............. G06N 3/045 |

OTHER PUBLICATIONS

Henderson, Matthew, Rami Al-Rfou, Brian Strope, Yun-Hsuan Sung, László Lukács, Ruiqi Guo, Sanjiv Kumar, Balint Miklos, and Ray Kurzweil. "Efficient natural language response suggestion for smart reply." arXiv preprint arXiv:1705.00652 (2017).*

(Continued)

*Primary Examiner* — Edwin S Leland, III
(74) *Attorney, Agent, or Firm* — Fish & Richardson P.C.

(57) ABSTRACT

Methods, systems, and apparatus, including computer programs encoded on a computer storage medium, for performing a machine learning task on a network input to generate a network output. In one aspect, one of the systems includes a neural network configured to perform the machine learning task, the neural network comprising an N-grammer layer and an output neural network, the N-grammer layer configured to: at each of one or more heads: receive a sequence of input embeddings; generate a discrete latent representation of the sequence of input embeddings by using a learned product quantization codebook; generate a plurality of n-gram indices from the discrete latent representation; and generate a latent n-gram representation of the sequence of input embeddings; and generate a sequence of output embeddings, and the output neural network configured to: receive the sequence of output embeddings; and process the sequence of output embeddings to generate the network output.

20 Claims, 3 Drawing Sheets

(56) References Cited

U.S. PATENT DOCUMENTS

2024/0078379 A1* 3/2024 Anil ................... G06N 3/045

OTHER PUBLICATIONS

Wu, Xiang, Ruiqi Guo, David Simcha, Dave Dopson, and Sanjiv Kumar. "Efficient inner product approximation in hybrid spaces." arXiv preprint arXiv:1903.08690 (2019).*
Agarwal et al., "Disentangling Adaptive Gradient Methods from Learning Rates," CoRR, Submitted on Feb. 26, 2020, arXiv:2002. 11803v1, 26 pages.
Ainslie et al., "ETC: Encoding Long and Structured Inputs in Transformers," CoRR, Submitted on Oct. 27, 2020, arXiv:2004. 08483v5, 17 pages.
Ba et al., "Layer Normalization," CoRR, Submitted on Jul. 21, 2016, arXiv:1607.06450v1, 14 pages.
Bahdanau et al., "Neural Machine Translation by Jointly Learning to Align and Translate," Presented at Proceedings of the 3rd International Conference on Learning Representations, San Diego, CA, May 7-9, 2015; CoRR, Submitted on Apr. 24, 2015, arXiv:1409. 0473v6, 15 pages.
Bottou et al., "Convergence Properties of the K-Means Algorithms," Presented at the Advances in Neural Information Processing Systems Conference, Denver, Colorado, Nov. 28-Dec. 1, 1994; Advances in Neural Information Processing Systems 7, Jul. 1995, pp. 585-592.
Brown et al., "Class-Based n-gram Models of Natural Language," Computational Linguistics, Dec. 1992, 18(4):467-480.
Brown et al., "Language Models are Few-Shot Learners," CoRR, Submitted on Jul. 22, 2020, arXiv:2005.14165v1, 75 pages.
Brown et al., "The Mathematics of Statistical Machine Translation: Parameter Estimation," Computational Linguistics, Jun. 1993, 19(2):263-311.
Chen et al., "An Empirical Study of Smoothing Techniques for Language Modeling," Computer Speech & Language, Oct. 1999, 13(4):359-394.
Cho et al., "Learning Phrase Representations Using RNN Encoder-Decoder for Statistical Machine Translation," Presented at Proceedings of the 2014 Conference on Empirical Methods in Natural Language Processing, Oct. 25-29, 2014, Doha, Qatar, pp. 1724-1734.
Correia et al., "Adaptively Sparse Transformers," CoRR, Submitted on Sep. 6, 2019, arXiv:1909.00015v2, 20 pages.
Dauphin et al., "Language Modeling with Gated Convolutional Networks," Presented at Proceedings of the 34th International Conference on Machine Learning, Sydney, Australia, Aug. 6-11, 2017, 9 pages.
Devlin et al., "BERT: Pre-training of Deep Bidirectional Transformers for Language Understanding," CoRR, Submitted on May 24, 2019, arXiv:1810.04805v2, 16 pages.
Fedus et al., "Switch Transformers: Scaling to Trillion Parameter Models with Simple and Efficient Sparsity," CoRR, Submitted on Jan. 11, 2021, arXiv:2101.03961v1, 31 pages.
Ge et al., "Optimized Product Quantization for Approximate Nearest Neighbor Search," Presented at the IEEE Conference on Computer Vision and Pattern Recognition, Portland, Oregon, Jun. 23-28, 2013, pp. 2946-2953.
Graves et al., "Neural Turing Machines," CoRR, Submitted on Dec. 10, 2014, arXiv:1410.5401v2, 26 pages.
Guu et al., "REALM: Retrieval-Augmented Language Model Pre-Training," CoRR, Submitted on Feb. 10, 2020, arXiv:2002. 08909v1, 12 pages.
Hendrycks et al., "Gaussian Error Linear Units (GELUs)," CoRR, Submitted on Jul. 8, 2020, arXiv:1606.08415v4, 9 pages.
Huang et al., "Lookup-Table Recurrent Language Models for Long Tail Speech Recognition," CoRR, Submitted on Jun. 7, 2021, arXiv:2104.04552v2, 5 pages.
Jegou et al., "Product Quantization for Nearest Neighbor Search," IEEE Transactions on Pattern Analysis and Machine Intelligence, Jan. 2011, 33(1):117-128.
Kaiser et al., "Fast Decoding in Sequence Models Using Discrete Latent Variables," CoRR, Submitted on Jun. 7, 2018, arXiv:1803. 03382v6, 10 pages.
Katz, "Estimation of Probabilities from Sparse Data for the Language Model Component of a Speech Recognizer," IEEE Transactions on Acoustics, Speech, and Signal Processing, Mar. 1987, 35(3):400-401.
Khandelwal et al., "Generalization Through Memorization: Nearest Neighbor Language Models," CoRR, Submitted on Nov. 1, 2019, arXiv:1911.00172v1, 13 pages.
Kingma et al., "ADAM: A Method For Stochastic Optimization," Presented at Proceedings of 3rd International Conference on Learning Representations, San Diego, CA, May 7-9, 2015; CoRR, Submitted on Jan. 30, 2017, arXiv:1412.6980v9, 15 pages.
Kneser et al., "Improved Backing-Off For M-Gram Language Modeling," Presented at the International Conference on Acoustics, Speech, and Signal Processing, Detroit, MI, May 9-12, 1995, pp. 181-184.
Krishna et al., "Hurdles to Progress in Long-form Question Answering," CoRR, Submitted on May 19, 2021, arXiv:2103.06332v2, 18 pages.
Lample et al., "Large Memory Layers with Product Keys," CoRR, Submitted on Dec. 16, 2019, arXiv:1907.05242v2, 12 pages.
Lepikhin et al., "GShard: Scaling Giant Models with Conditional Computation and Automatic Sharding," CoRR, Submitted on Jun. 30, 2020, arXiv:2006.16668v1, 35 pages.
Lewis et al., "Retrieval-Augmented Generation for Knowledge-Intensive NLP Tasks," CoRR, Submitted on Apr. 12, 2021, arXiv:2005. 11401v4, 19 pages.
Mikolov et al., "Efficient Estimation of Word Representations in Vector Space," CoRR, Submitted on Sep. 7, 2013, arXiv:1301. 3781v3, 12 pages.
Panigrahy et al., "Sketch Based Memory for Neural Networks," Presented at Proceedings of the International Conference on Artificial Intelligence and Statistics, held virtually, Apr. 13-15, 2021, 12 pages.
Raffel et al., "Exploring the Limits of Transfer Learning with a Unified Text-to-Text Transformer," CoRR, Submitted on Oct. 24, 2019, arXiv:1910.10683v2, 53 pages.
Roy et al., "Efficient Content-Based Sparse Attention with Routing Transformers," Transactions of the Association for Computational Linguistics, Feb. 1, 2021, 9:53-68.
Roy et al., "Theory and Experiments on Vector Quantized Autoencoders," CoRR, Submitted on Jul. 20, 2018, arXiv:1805.11063v2, 11 pages.
s3-us-west-2.amazonaws.com [offline], "Improving Language Understanding by Generative Pre-Training," available on or before Jul. 31, 2018, via Internet Archive: Wayback Machine URL<https://web.archive.org/web/20180731142036/https://s3-us-west-2.amazonaws.com/openai-assets/research-covers/language-unsupervised/language_understanding_paper.pdf>, retrieved on Sep. 17, 2024, URL<https://s3-us-west-2.amazonaws.com/openai-assets/research-covers/language-unsupervised/language understanding_paper.pdf>, 12 pages.
Schneider et al., "wav2vec: Unsupervised Pre-Training for Speech Recognition," CoRR, Submitted on Sep. 11, 2019, arXiv:1904. 05862v4, 9 pages.
Shazeer, "GLU Variants Improve Transformer," CoRR, Submitted on Feb. 12, 2020, arXiv:2002.05202v1, 5 pages.
So et al., "Primer: Searching for Efficient Transformers for Language Modeling," CoRR, Submitted on Sep. 17, 2021, arXiv:2109. 08668v1, 34 pages.
Su et al., "RoFormer: Enhanced Transformer with Rotary Position Embedding," CoRR, Submitted on Oct. 9, 2021, arXiv:2104. 09864v2, 14 pages.
Thorup, "High Speed Hashing for Integers and Strings," CoRR, Submitted on Sep. 15, 2015, arXiv:1504.06804v3, 17 pages.
Van den Oord et al., "Neural Discrete Representation Learning," CoRR, Submitted on Nov. 2, 2017, arXiv:1711.00937v1, 10 pages.
Vaswani et al., "Attention is all you Need," CoRR, Submitted on Dec. 6, 2017, arXiv:1706.03762v5, 15 pages.

(56) References Cited

OTHER PUBLICATIONS

Wang et al., "Style Tokens: Unsupervised Style Modeling, Control and Transfer in End-to-End Speech Synthesis," Presented at the International Conference on Machine Learning, Stockholm, Sweden, Jul. 10-15, 2018, 10 pages.
Weston et al., "Memory Networks," CoRR, Submitted on Dec. 24, 2014, arXiv:1410.3916v4, 14 pages.
Wu et al., "CvT: Introducing Convolutions to Vision Transformers, " CoRR, Submitted on Mar. 29, 2021, arXiv:2103.15808v1, 10 pages.
Wu et al., "Google's Neural Machine Translation System: Bridging the Gap between Human and Machine Translation," CoRR, Submitted Oct. 8, 2016, arXiv:1609.08144v2, 23 pages.
Yu et al., "Product Quantization Network for Fast Image Retrieval," Presented at Proceedings of the European Conference on Computer Vision (ECCV), Munich, Germany, Sep. 8-14, 2018, 16 pages.
Zaheer et al., "Big Bird: Transformers for Longer Sequences," Presented at the Advances in Neural Information Processing Systems, Vancouver, Canada, Dec. 6-12, 2020; Advances in Neural Information Processing Systems 33, Dec. 2020, 15 pages.
Zeghidour et al., "Wavesplit: End-to-End Speech Separation by Speaker Clustering," IEEE/ACM Transactions on Audio, Speech, and Language Processing, Jul. 2021, 29:11 pages.

\* cited by examiner

ATTENTION NEURAL NETWORKS WITH N-GRAMMER LAYERS

BACKGROUND

This specification relates to performing a machine learning task on a network input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a machine learning task on a network input using a neural network. The neural network includes an N-grammer layer which is configured to generate one or more latent n-gram representations from a sequence of input embeddings derived from the network input. The neural network also includes an output neural network that is configured to process the latent n-gram representations to generate a network output for the machine learning task.

Particular embodiments of the subject matter described in this specification can be implemented so as to realize one or more of the following advantages.

The hashing-based input embedding techniques described in this specification allow a neural network system to perform a given machine learning task with reduced runtime latency, e.g., in terms of wall clock time that is needed to perform an inference for the task on an input, relative to existing attention-based neural networks that use conventional embedding layers to map network inputs to embedded representations. Specifically, the set of clustering and hashing operations applied by an N-grammer layer as described in this specification is both efficient and sparse. Unlike conventional embedding layers, the training and inference cost of the N-grammer layer thus does not scale proportionally to the number of parameters in the layer. By using this N-grammer layer to generate a latent n-gram representation of the input which can then be more effectively processed by an output sub-neural network, the described neural network system can achieve improved inference speed at no cost of task performance.

In some examples, the described neural network system can perform a range of natural language processing tasks, including summarization tasks, question answering tasks, text classification tasks, and the like, twice as fast as exiting systems in wall clock time, while achieving task performance that matches or even exceeds the state-of-the-art, e.g., in terms of perplexity score or some other accuracy measures.

The reduced runtime latency also makes the network training process faster. It can therefore require fewer computational resources, e.g., reduced processor cycles, reduced power consumption, or both, to train the described system on a range of tasks, including tasks that leverage unsupervised pre-training in order to improve performance on supervised downstream tasks with limited available training data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that performs a machine learning task on a network input to generate network output for the machine learning task.

Figure 1:
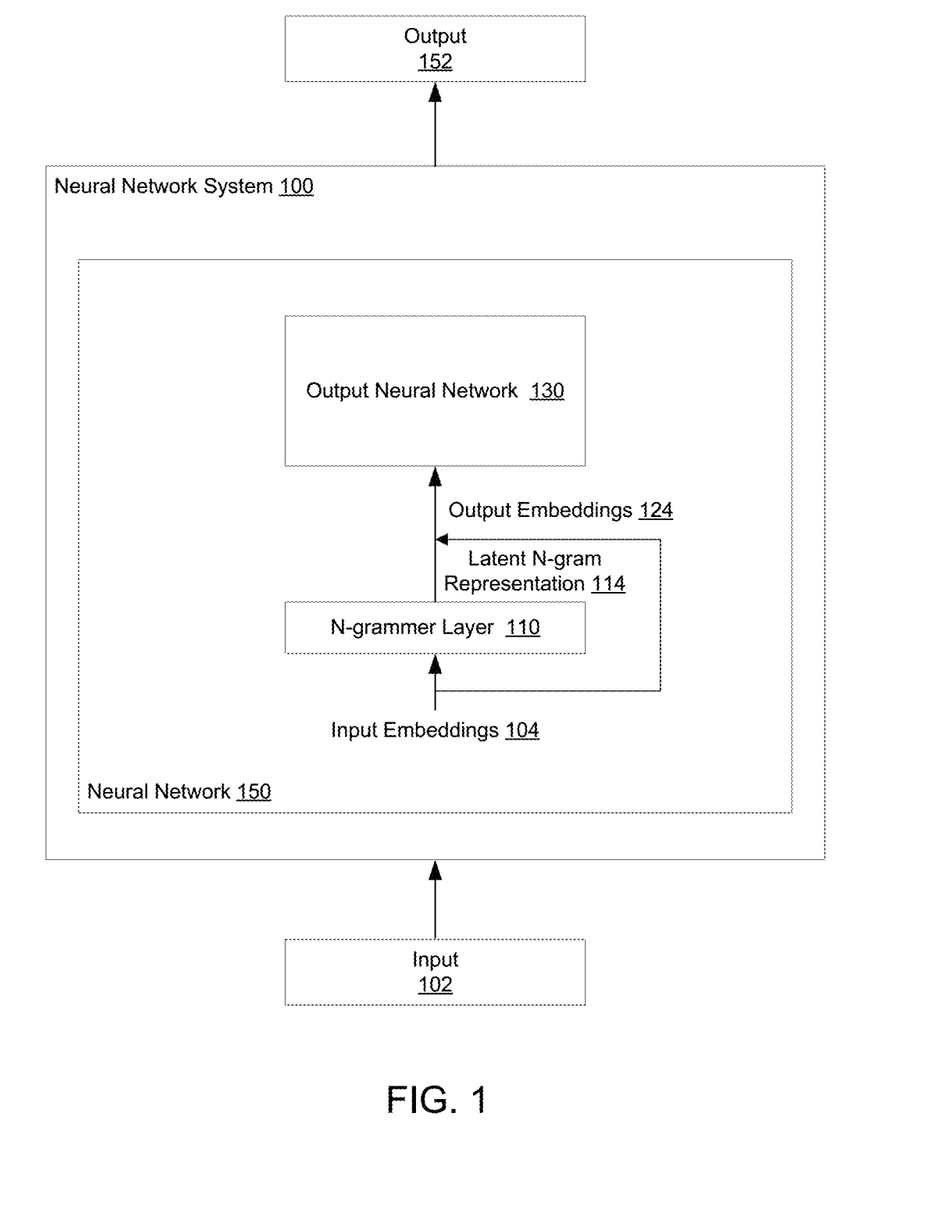
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 can receive a network input 102 and perform a machine learning task on the input 102 to generate a network output 152.

The machine learning task can be any machine learning task that (i) operates on a network input that is an input sequence, (ii) generates a network output that is an output sequence, or (iii) both.

Some examples of machine learning tasks that the system can be configured to perform follow.

As one example, the task may be a neural machine translation task. For example, if the input to the neural network is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language-target language pairs. In this example, the source language text may be augmented with an identifier that indicates the target language into which the neural network should translate the source language text.

As another example, the task may be an audio processing task. For example, if the input to the neural network is a sequence representing a spoken utterance, the output generated by the neural network may be a piece of text that is a predicted correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, where the input is a sequence of text in a natural language and the output is a natural language processing or understanding output. One example of such a task is an entailment task, where the input includes a plurality of natural language statements and the output indicates an entailment between the statements. Another example is a paraphrasing task, where the input is a natural language sequence and the output identifies another natural language sequence that has a similar meaning to the input sequence. Another example is a textual similarity task, where the input is a plurality of natural language sequences and the output indicates how similar, e.g., semantically similar, the input sequence are. Another example is a sentiment task, where the input is a natural language sequence and the output characterizes a sentiment of the input sequence. Another example is a sentence completion task, where the input is a natural language sequence and the output identifies another natural language sequence that is a completion of the input sequence. Another example is a summarization task, where the input is an input natural language text sequence and the output is a summary natural language sequence that is shorter than the input sequence but summarizes the input sequence, i.e., represents the most important or relevant information within the input sequence. In some cases, the summarization task is an extractive summarization task, where the output sequence is a proper subset of the input sequence, i.e., is made up of text from the input sequence. In some other cases, the summarization task is an abstractive summarization task, where the output is a new sequence that can contain different text from the input sequence. Another example is a grammaticality task, where the input is an input natural language text sequence and the output characterizes the grammaticality of the input sequence, i.e., how grammatically correct the input sequence is.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient. In this example, the electronic health record data for the patient can include a plurality of features representing health events in an electronic health record for the patient, with each of the plurality of features belonging to a vocabulary of possible features. One example type of possible features are numerical features that include laboratory test results or patient vital sign measurements, i.e., measurements of vital signs captured by a medical device, both of which can take many possible different values. Another example type of possible features are discrete features that include binary features like whether the patient was admitted for treatment during a given time period or categorical features like procedural codes assigned to a particular procedure or event. For the health prediction task, the output can include a predicted treatment that should be prescribed to the patient, the likelihood that an adverse health event will occur to the patient, or a predicted diagnosis for the patient.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input. As yet another example, the input to the text generation task can include both text and input from a different modality, and the output sequence can be text that responds to the input. For example, the task can be a visual question answering task, and the input can include one or more images and a text question about the one or more images, and the output sequence can be an answer to the text question.

As another example, the task can be an image generation task, where the input is a conditioning input and the output is a sequence of intensity value inputs for the pixels of an image. The conditioning input can include one or more of, e.g., a class label identifying a desired category of object that should be pictured in the image, a text sequence describing the desired content of the image, or another image, e.g., an image of an object that should be included in the new image or a lower-resolution image that should be upscaled to a higher resolution to generate the new image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent. The observations can include sensor data captured by sensors measuring the environment, e.g., camera sensors, Lidar sensors, temperature sensors, humidity sensors, and so on.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

To perform the machine learning task, the neural network system 100 includes a neural network 150 which in turn includes an N-grammer layer 110 and an output neural network 130. The N-grammer layer 110 is a layer which, when used to process the network input 102 to generate a sequence of output embeddings 124 to be provided to the output neural network 130 for further processing, can boost the inference speed of the neural network system 100.

Although one N-grammer layer is depicted in FIG. 1 for convenience, the neural network 150 can include multiple N-grammer layers that are stacked one after the other in a given order, i.e., arranged in a sequence with the output of any N-grammer layer except the last being an input to another of the N-grammer layers, so as to perform successive operations on the network input 102 to generate the sequence of output embeddings 124. Alternatively or in addition, in some implementations where the neural network 150 has an encoder-decoder architecture, the neural network 150 can include one N-grammer layer at the encoder neural network and another N-grammer layer at the decoder neural network.

The output neural network 130 can be implemented with any appropriate neural network architecture that enables it to perform the machine learning task by processing the sequence of output embeddings 124 to generate the network output 152. In various examples, the output neural network 130 can be a fully-connected neural network, i.e., that includes one or more fully-connected neural network layers, or can alternative be a recurrent neural network, e.g., that includes one or more long short-term memory (LSTM) neural network layers.

As a particular example, the output neural network 130 can be an attention neural network that includes a plurality of attention layers. Each attention layer operates on a respective input sequence that includes a respective layer input at each of one or more positions.

Moreover, each of the attention layers includes an attention sub-layer and a feed-forward sub layer. The attention sub-layer receives the input sequence for the layer and applies an attention mechanism on the input sequence for the layer to generate an attended input sequence. The attention mechanism applied by the attention layer depends on the configuration of the neural network, as will be described in more detail below. The feed-forward sub-layer then operates on the attended input sequence to generate an output sequence for the layer.

Generally, the attention layers within the output neural network 130 can be arranged in any of a variety of configurations.

As one example, when the network input is an input sequence, the output neural network can include an encoder neural network that includes a subset of the plurality of attention layers and that encodes the input sequence to generate a respective encoded representation of each input in the sequence. In this example, the attention mechanism applied by the attention layers in the encoder is a self-attention mechanism, e.g., a multi-head self-attention mechanism.

As another example, the output neural network can include a decoder neural network that includes a different subset of the plurality of attention layers and that processes either the network input or the encoded representation of the network input to generate the network output. In some of these examples, when the network output is an output sequence the decoder neural network operates auto-regressively and the attention sub-layers within some or all of the attention layers of the decoder apply masked self-attention over the partially generated output sequence. When the output neural network includes both an encoder and a decoder, some of the attention layers in the decoder apply cross-attention into the encoded representations while others apply self-attention over the output sequence, either masked or not masked. When the output neural network includes a decoder neural network that operates directly on the input sequence, the attention layers within the decoder can apply a self-attention mechanism over the input sequence.

The specifics of the operation of the attention layers within the decoder neural network and the encoder neural network are described in more detail in Vaswani, et al, *Attention Is All You Need*, arXiv:1706.03762, and Raffel, et al, *Exploring the Limits of Transfer Learning with a Unified Text-to-Text Transformer*, arXiv:1910.10683, and Devlin et al, *BERT: Pre-training of Deep Bidirectional Transformers for Language Understanding*, arXiv: 1810.04805, the entire contents of which are hereby incorporated by reference herein in their entirety.

In particular, the N-grammer layer 110 is configured to operate on a sequence of input embeddings 104 to generate a latent N-gram representation 114 of the sequence of input embeddings 104. The sequence of input embeddings has a respective input embedding at each of a plurality of input embedding positions and the latent N-gram representation 114 has a respective n-gram embedding at each of the plurality of input embedding positions. That is, for each of the plurality of input embedding positions in the sequence of input embeddings 104, the N-grammer layer 110 maps an input embedding at the input embedding position to a corresponding n-gram embedding.

In general, the sequence of input embeddings 104 can be any intermediate sequential data generated by the neural network 150 when performing the machine learning task on the network input 102. Each input embedding in the sequence of input embeddings 104 can be a vector of numeric values having a fixed dimensionality that is derived from the network input 102.

In some examples, the sequence of input embeddings 104 can be generated by a preceding system component in the neural network 150, which can be a vectorizer that is configured to vectorize the network input 102 into multiple tokens selected from a vocabulary of all possible tokens that is used by the system, with each token being a one-hot vector or some other vectorized representation. That is, in some of these examples, each input embedding in the sequence of input embeddings 104 can be a one-hot vector generated from the network input 102. In others of these examples, the sequence of input embeddings 104 can alternatively be generated by a preceding N-grammer layer or another layer in the neural network 150.

In other examples, when the neural network 150 generates the network output auto-regressively, the sequence of input embeddings 104 can include embedded representations of the currently generated network output as of the current time step and, optionally, embedded representations of the of network input 102.

In many conventional neural network systems, e.g., including those described in the references cited above, an embedding layer may then be used to map the sequence of input embeddings into a sequence of output embeddings before providing the sequence as input to the output neural network 130. The embedding layer may be configured to, for each input embedding in the sequence, map the input embedding to a numeric representation of the input embedding in an embedding space, e.g., map a discrete one-hot vector into a continuous vector in the embedding space, and optionally also add positional encoding information to the numeric representation. Such an embedding layer may generate the numeric representations by applying one or more (learned) embedding transformations to the sequence of input embeddings, in accordance with current values of a set of embedding layer parameters. Because the total number of the embedding layer parameters is typically dependent on the size of the vocabulary and on the type or number of the embedding transformations that are used by the system, the adoption of a larger library, more complex embedding transformations, and the like will scale up the parameters included in the embedding layer and naturally introduce a significant computational overhead.

The neural network 150 as described in the specification, however, uses a new type of embedding layer, namely the N-grammer layer 110, which applies a different set of operations to the sequence of input embeddings 104 to generate a latent N-gram representation 114, which can then be combined with the sequence of input embeddings 104 to generate the sequence of output embeddings 124 to be provided to the output neural network 130. The operations performed by the N-grammer layer 110 are described below with reference to FIGS. 2 and 3. Unlike the conventional embedding layers, the set of operations applied by the N-grammer layer are sparse and efficient, and thus the training and inference overhead of a neural network having the N-grammer layer does not scale proportionally to the number of parameters in the N-grammer layer.

Figure 2:
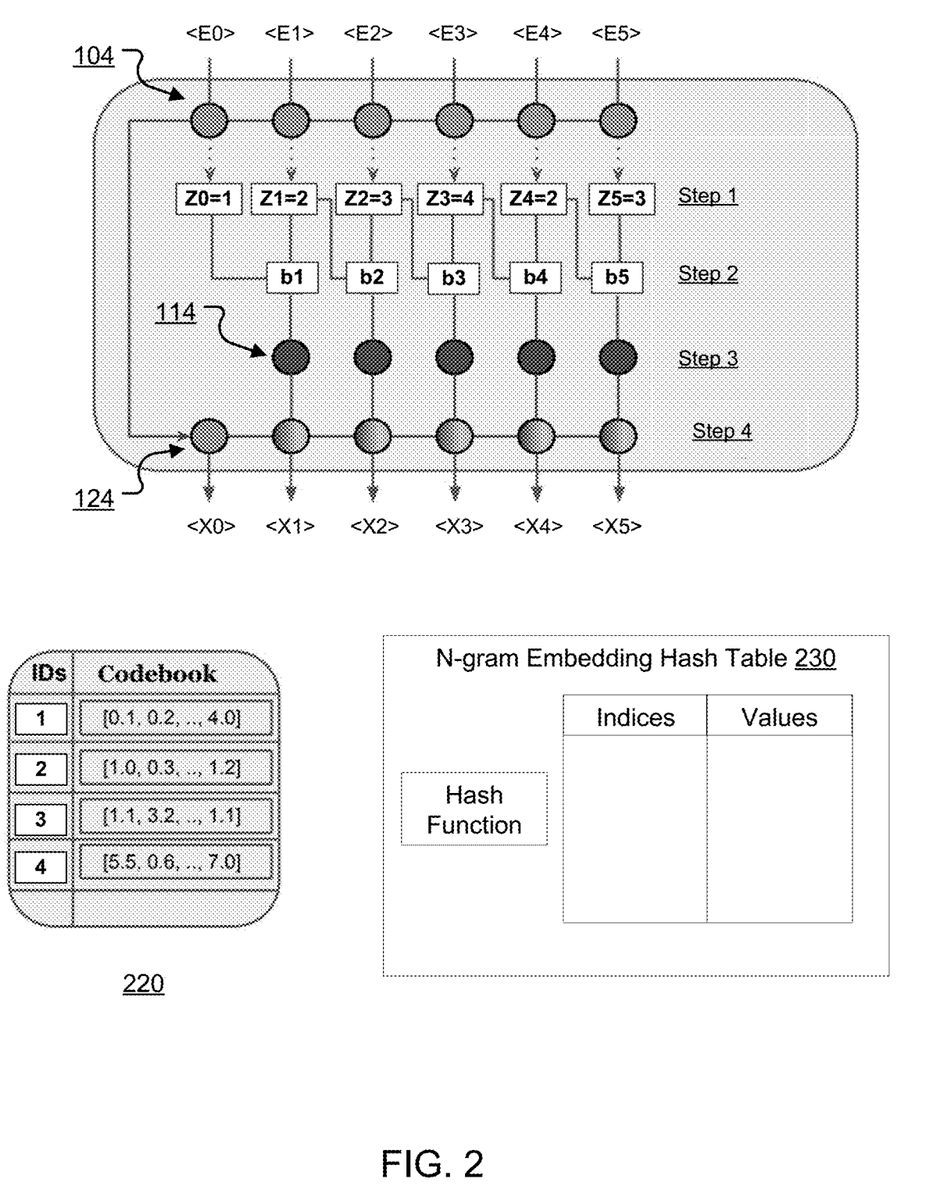
FIG. 2 shows an example of operations performed by an N-grammer layer.

FIG. 2 shows an example of operations performed by an N-grammer layer. For example, these operations can be performed by the N-grammer layer 110 of FIG. 1 for a sequence of input embeddings 104 that has a respective input embedding at each of a plurality of input embedding positions. Each input embedding, e.g., the input embedding <E1>, in the sequence of input embeddings 104 can be a vector of numeric values that has a fixed dimensionality d.

In some implementations, the layer has multiple N-grammer heads that each receive a respective sequence of input embeddings, and the N-grammer layer can perform some of these operations, e.g., in parallel, at each N-grammer head of the N-grammer layer to generate a corresponding latent n-gram representation of the respective sequence of input embeddings received at the N-grammer head, which are then combined to generate the sequence of output embeddings. In some other implementations, the N-grammer layer includes only a single N-grammer head and therefore only performs these operations once to generate the sequence of output embeddings.

At step one, the N-grammer layer generates, at each N-grammer head, a discrete latent representation of a sequence of input embeddings 104 by using a learned product quantization (PQ) codebook 220. The product quantization codebook 220 has k different cluster indices (or cluster IDs) that each map to a respective code word. In some implementations, different N-grammer heads use different PQ codebooks that have different code words (but all have a same fixed size k, i.e., have the same number of code words), while in other implementations, different N-grammer heads use the same PQ codebook. For example, the PQ codebook can include k=4096 code words, although in other examples the PQ codebook can have a smaller size (e.g., k=1024), or a larger size (e.g., k=8192), depending on the actual size of the token vocabulary used by the system.

For each of the plurality of input embedding positions in the given sequence of input embeddings, the N-grammer layer determines which of the code words from the PQ codebook 220 that the input embedding at the position is closest to. In some implementations, this can include calculating a Euclidean distance (or another distance measure, such as Manhattan distance) between the input embedding and each code word and selecting the code word with the least Euclidean distance to the input embedding.

The discrete latent representation of the sequence of input embeddings thus includes, at each of the plurality of input embedding positions, a corresponding cluster index that maps to a closest code word in the PQ codebook to the input embedding at the position. In the example of FIG. 2, the first input embedding position has cluster index $z_0$=ID 1, which maps to a closest code word to the input embedding <E0> at the first input embedding position; the second and fifth input embedding positions have cluster indices $z_1$=$z_4$=ID 2, which maps to a closest code word to the input embeddings <E2> and <E4> at the second and fifth input embedding positions, respectively, and so on.

At step two, the N-grammer layer generates, at each N-grammer head, a plurality of n-gram indices from the discrete latent representation. As used in this specification, the term "n-gram" refers to a set of n consecutive data items from a sequence of data items. An n-gram of size one may be referred to as a "uni-gram," an n-gram of size two may be referred to as a "bi-gram," and an n-gram of size three may be referred to as a "tri-gram," and the like. As such, the input embeddings may also be referred to as uni-gram embeddings.

In the example of FIG. 2, a plurality of bi-gram indices are generated from the discrete latent representation. At each of the plurality of input embedding positions, the latent bi-gram index for the position can be generated by determining a combination of (i) the cluster index $z\_i$ for the position i and (ii) the cluster index $z\_(i-1)$ at the preceding position i−1, multiplied by k, the size of the PQ codebook:

$$b_i = \begin{cases} z_i & \text{if } i = 0, \\ z_i + kz_{i-1} & \text{otherwise} \end{cases}.$$

For the very first position in the plurality of input embedding positions, because there is no preceding input embedding position, the N-grammer layer can instead use the cluster index determined at step one as the n-gram index. In this example, a total of $k^2$ bi-gram indices can be generated for the plurality of input embedding positions, i.e., each input embedding position is assigned a respective n-gram index selected from the $k^2$ bi-gram indices.

In other examples, tri-gram indices or some other higher order n-gram indices can be generated in a similar manner. At each of the plurality of input embedding positions, the latent n-gram index for the position can be generated by determining a combination of (i) the cluster index for the position and (ii) the respective cluster indices at one or more preceding positions, where the preceding cluster indices are each multiplied by k, the size of the PQ codebook. Likewise, for the positions where there aren't enough preceding input embedding positions, the N-grammer layer can instead use the cluster indices determined at step one as the n-gram indices. The total number of n-gram indices that can be generated in this manner is generally $k^n$, where n is the order of the n-gram index.

At step three, the N-grammer layer generates, at each N-grammer head, a latent n-gram representation 114 of the sequence of input embeddings 104 that includes a respective n-gram embedding at each of the plurality of input embedding positions by using a learned n-gram embedding hash table 230.

An n-gram embedding hash table, or for short, a hash table, refers to a data structure that can map keys to values. The idea of hashing is to distribute entries (key/value pairs) across an array of buckets or slots. A hash table uses a hash function to map a key to a hash code, where the hash code is an index into the array of buckets or slots, from which the value corresponding to the key can be found. As used in this specification, the keys can be the n-gram indices, and the values stored in the n-gram embedding hash table can be the N-gram embeddings.

Thus, in some implementations, to generate a respective n-gram embedding at each of the plurality of input embedding positions, the N-grammer layer can evaluate a hash function to map the n-gram index at the input embedding position to an index into the array of buckets or slots in the n-gram embedding hash table 230, and then use the value stored at the bucket or slot that corresponds to the index as the respective n-gram embedding for the input embedding position. In these implementations, the n-gram embedding hash table 230 can have an n-gram vocabulary of size v, i.e., can have an array of a total of v buckets or slots storing distinct values, where each value (and, corresponding, each n-gram embedding) can be a vector of numeric values that has a fixed dimensionality $d_b$. In some implementations, the n-gram embedding and the input embedding can have a same dimension (e.g., $d_b=d=512$ or 1024) while in other implementations, the n-gram embedding can have a different (e.g., larger) dimension than the input embedding.

In some of these implementations, different N-grammer heads use different n-gram embedding hash tables that have different n-gram vocabularies (but all have a same fixed vocabulary size, i.e., have a same number of distinct hash values), while in others of these implementations, different N-grammer heads use the same n-gram embedding hash table.

As used in this specification, the term "learned" means that an operation or a value has been adjusted during the training of the neural network 150. Thus a learned product quantization (PQ) codebook means that the respective values of the variables that make up the code words are determined through the training of the neural network 150. Likewise, a learned n-gram embedding hash table means that the values stored within the N-gram embedding hash table are determined through the training of the neural network 150.

In these implementations, the hash function can be any of the example hash functions described in Thorup, Mikkel. "*High speed hashing for integers and strings.*" arXiv preprint arXiv:1504.06804 (2015), in addition to or instead of other known hash functions.

For example, to map a given key (the n-gram index at a given input embedding position) to a hash code (the index into the array of buckets, from which the n-gram embedding for the given input embedding position can be found), the N-grammer layer can evaluate a multiply-mod-prime hash function, which generally involves a modulus operation against the size of the n-gram vocabulary. The multiply-mod-prime hash function can be in the form of:

$$((rb+s) \bmod p) \bmod v,$$

where p is a randomly selected prime number greater than $k^2$, r is randomly selected from $\{1, \ldots, p-1\}$, s is randomly selected from $\{0, \ldots, p-2\}$, v is a size of a vocabulary of the n-gram embedding hash table, and b is the n-gram index at the given input embedding position. As a strongly universal hashing scheme, this multiply-mod-prime scheme guarantees a low collision probability for the n-gram embeddings for each N-grammer head.

At step four, the N-grammer layer then generates a sequence of output embeddings 124 that includes a respective n-gram embedding at each of the plurality of input embedding positions by determining a combination of the respective sequence of input embeddings received by each N-grammer head and the respective latent n-gram representation of the sequence of input embeddings generated by each N-grammer head. In some implementations, this can include determining, along a given dimension, a first concatenation of the respective latent n-gram representations generated by the one or more heads of the N-grammer layer; determining, along the given dimension, a second concatenation of the respective sequences of input embeddings received at the one or more heads of the N-grammer layer; and then determining, along the given dimension, a third concatenation of the first and second concatenations. In these implementations, each output embedding, e.g., the output embedding <X1>, in the sequence of output embeddings 124 can be a vector (a one-dimensional tensor) with the dimension of $d \times h + d_b \times h$, where h is the number of N-grammer heads included in the N-grammer layer, and d and $d_b$ are the dimensions of the input embedding vectors and the n-gram embeddings vectors, respectively.

In some other implementations, this can include determining, along the given dimension, a first concatenation of the respective latent n-gram representations generated by the one or more heads of the N-grammer layer; determining, along the given dimension, a second concatenation of the respective sequences of input embeddings received at the one or more heads of the N-grammer layer; and then determining a position-wise summation of the first and second concatenations. In these implementations, each output embedding, e.g., the output embedding <X1>, in the sequence of output embeddings 124 can be a vector with the dimension of $h \times d$, where h is the number of N-grammer heads included in the N-grammer layer, and d is the dimension of the input embedding vectors (which is the same as the dimension $d_b$ of the n-gram embeddings vectors).

In some implementations, prior to determining the combination, the N-grammer layer is configured to apply a first layer normalization to the concatenated sequences of input embeddings, and apply a second layer normalization to the concatenated latent n-gram representations. In these implementations, N-grammer layer then generates the sequence of output embeddings by determining a combination of the layer normalized concatenated sequences of input embeddings and the layer normalized concatenated latent n-gram representations. In some of these implementations, the first and second layer normalizations are applied by using a same layer normalization layer included in the N-grammer layer, while in others of these implementations, the first and second layer normalizations are applied by using two different layer normalization layers.

The N-grammer layer can provide the sequence of output embeddings 124 as input to the output neural network 130 or other components of the attention neural network, e.g., another N-grammer layer in the stack of multiple N-grammer layers, for further processing. If there is only one N-grammer layer, or if the N-grammer layer is the final N-grammer layer in the stack, the output neural network 130 is configured to receive the sequence of output embeddings and then process the sequence of output embeddings to generate the network output 152 for the machine learning task.

Figure 3:
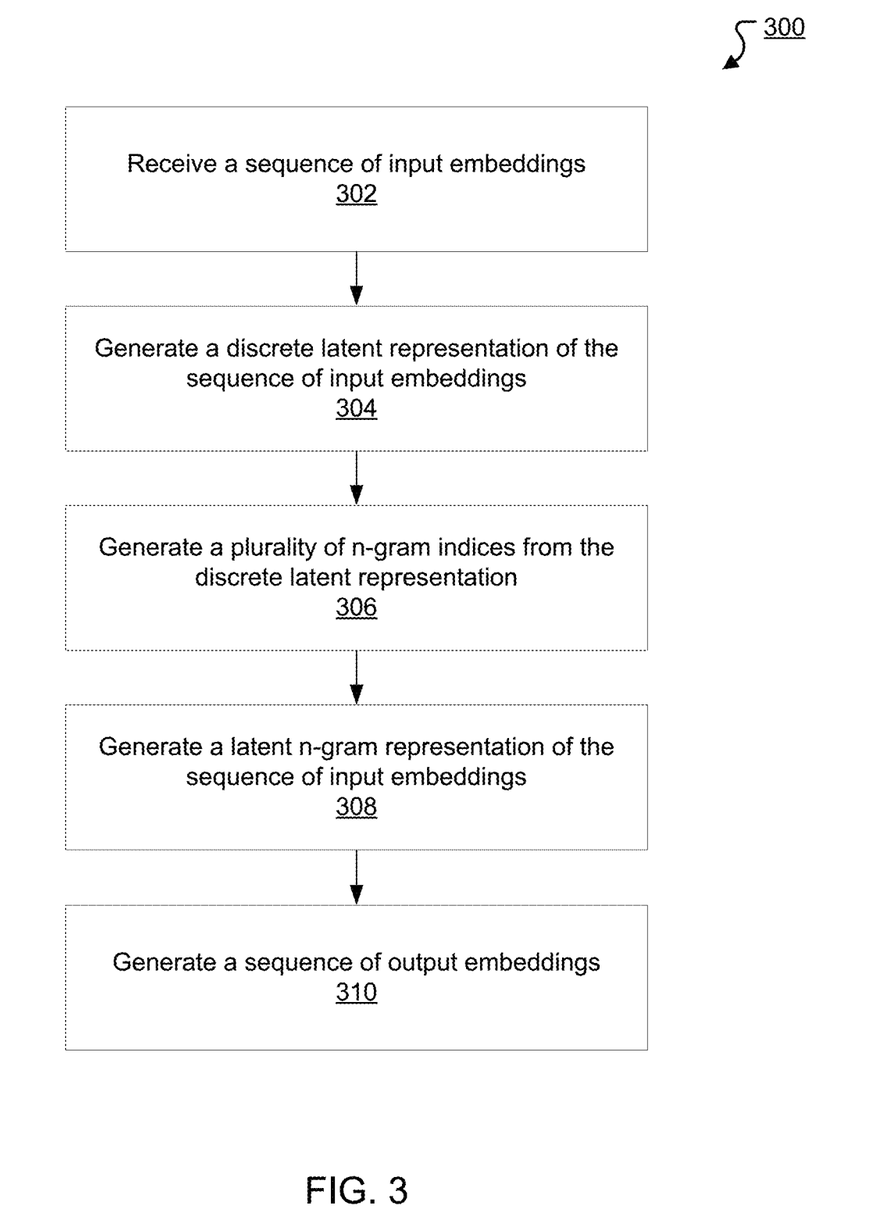
FIG. 3 is a flow diagram of an example process for generating a network output from a network input.

FIG. 3 is a flow diagram of an example process for generating a network output from a network input. For convenience, the process 300 will be described as being performed by a system of one or more computers located in one or more locations. For example, a neural network system, e.g., neural network system 100 of FIG. 1, appropriately programmed in accordance with this specification, can perform the process 300.

In general, the system can repeatedly perform the following steps 302-308 at each of the one or more N-grammer heads of an N-grammer layer within a neural network, which includes both the N-grammer layer and an output neural network. By repeatedly performing the steps 302-308 for all of the N-grammer heads of the N-grammer layer to generate a sequence of output embeddings and then by processing at least part of the sequence of output embeddings using the output neural network, the system can generate a network output for a received network input.

The system receives, at each N-grammer head, a sequence of input embeddings that includes a respective input embedding at each of a plurality of input embedding positions (step 302). The sequence of input embeddings can be derived from the received network input. Each input embedding in the sequence of input embeddings can be a vector of numeric values that has a fixed dimensionality d.

The system generates a discrete latent representation of the sequence of input embeddings by using a learned product quantization codebook having k different cluster indices that each map to a respective code word (step 304). The discrete latent representation of the sequence of input embeddings includes, at each of the plurality of input embedding positions, a corresponding cluster index that maps to a closest code word to the input embedding at the input embedding position.

In some implementations, at each of the plurality of input embedding positions, this can include selecting a code word from among all k code words in the learned product quantization codebook that has a least Euclidean distance (or another distance measure, such as Manhattan distance) from the input embedding at the input embedding position, and assigning the input embedding to the cluster index that maps to the selected code word.

The system generates a plurality of n-gram indices from the discrete latent representation (step 306). In some implementations, this can include assigning to each of the plurality of input embedding positions a respective n-gram index based on the corresponding cluster index at the input embedding position and respective cluster indices at one or more preceding input embedding positions.

In these implementations, to generate a respective n-gram index for each of the plurality of input embedding positions, the system determines a combination of the corresponding cluster index at the input embedding position and a respective cluster index at each of n preceding input embedding positions, where each preceding cluster index is multiplied by k. For the very first position in the plurality of input embedding positions, because there is no preceding input embedding position, the system can instead use the cluster index determined at step 304 as the n-gram index. In this manner a total number of $k^n$ n-gram indices can be generated, where n is the order of the n-gram index.

The system generates a latent n-gram representation of the sequence of input embeddings that includes a respective n-gram embedding at each of the plurality of input embedding positions by using an n-gram embedding hash table and the plurality of n-gram indices (step 308).

In some implementations, to generate a respective n-gram embedding at each of the plurality of input embedding positions, the system can evaluate a hash function to map the n-gram index at the input embedding position to an index into an array of buckets in the n-gram embedding hash table, and then use the value stored at the bucket that corresponds to the index as the respective n-gram embedding for the input embedding position. Each value (and, correspondingly, each n-gram embedding) can be a vector of numeric values that has a fixed dimensionality $d_b$. Example hash functions that can be used in these implementations include multiply-mod-prime hash functions, multiply-shift hash functions, and the like.

The system generates a sequence of output embeddings (step 310) by determining a first combination, e.g., a vertical concatenation, of the respective latent n-gram representations of the sequence that have been generated for the one or more heads of the N-grammer layer, and then determining a second combination, e.g., a depth concatenation, of the combined latent n-gram representations and the sequence of input embeddings.

In some implementations, prior to determining the combination, the system first applies respective layer normalizations to the sequence of input embeddings and to the latent n-gram representation of the sequence of input embeddings for each head. In these implementations, the N-grammer layer then generates the sequence of output embeddings by determining a combination of the layer normalized sequence of input embeddings and the layer normalized latent n-gram representation of the sequence of input embeddings for each head.

The N-grammer layer can then provide the sequence of output embeddings as input to the output neural network. The output neural network is configured to receive the sequence of output embeddings, and process the sequence of output embeddings to generate the network output for the machine learning task. In some implementations, the output neural network can be an attention neural network, i.e., that includes one or more attention neural network layers. Each attention neural network layer is configured to apply an attention mechanism to an attention layer input derived from the sequence of output embeddings to generate an attention layer output for the attention neural network layer.

In general, the process 300 can be performed as part of predicting a network output for a network input for which the desired output, i.e., the network output that should be generated by the system for the network input, is not known.

The process 300 can also be performed as part of processing inputs derived from a set of training data, i.e., inputs derived from a set of inputs for which the output that should be generated by the system is known, in order to train the neural network to determine trained values for the parameters of the neural network, as well as to determine the code words in the product quantization (PQ) codebook and the values in the n-gram embedding hash table. The system can repeatedly perform the process 300 on inputs selected from a set of training data as part of a conventional machine learning training technique, e.g., a gradient descent with backpropagation training technique that uses a conventional optimizer, e.g., stochastic gradient descent, RMSprop, or Adam optimizer, to train the N-grammer layer(s) and the layers within the output neural network and, by virtue of the differentiable nature of the code words and the n-gram embeddings, to update the PQ codebook and the n-gram embedding hash table to optimize an objective function that is appropriate for the task that the neural network is configured to perform.

During training, the system can incorporate any number of techniques to improve the speed, the effectiveness, or both of the training process. For example, to train the PQ codebook, the system can use the mini-batch k-means technique described in more detail at Leon Bottou et al, 1995. *Convergence properties of the k-means algorithms*. In Advances in neural information processing systems, pages 585-592. As another example, the system can use different learning rates to train different components of the system, e.g., update the n-gram embedding hash table using a greater learning rate than that used to train the layers within the output neural network, so as to stabilize the training process. As another example, the system can perform the training using a distributed architecture that trains multiple instances of the attention neural network in parallel. Moreover, the system can first pre-train the neural network on a large unsupervised data set through unsupervised learning, e.g., to minimize a BERT loss or other unsupervised loss, and then fine-tune the neural network on task-specific training data to optimize the objective function for the task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for performing a machine learning task on a network input to generate a network output, the system comprising one or more computers and one or more storage devices storing instructions that, when executed by the one or more computers, cause the one or more computers to implement:
a neural network configured to perform the machine learning task, the neural network comprising an N-grammer layer and an output neural network, the N-grammer layer configured to:
at each of one or more heads:
receive a sequence of input embeddings derived from the network input that includes a respective input embedding at each of a plurality of input embedding positions;
generate a discrete latent representation of the sequence of input embeddings by using a learned product quantization codebook having different cluster indices that each map to a respective code word, wherein the discrete latent representation of the sequence of input embeddings comprises, at each of the plurality of input embedding positions, a corresponding cluster index that maps to a closest code word to the input embedding at the input embedding position;
generate a plurality of n-gram indices from the discrete latent representation, comprising assigning to each of the plurality of input embedding positions a respective n-gram index based on the corresponding cluster index at the input embedding position and respective cluster indices at one or more preceding input embedding positions; and
generate a latent n-gram representation of the sequence of input embeddings that includes a respective n-gram embedding at each of the plurality of input embedding positions by using an n-gram embedding hash table and the plurality of n-gram indices; and
generate a sequence of output embeddings by determining a combination of the sequence of input embeddings and the latent n-gram representation of the sequence of input embeddings for each head, and
the output neural network configured to:
receive the sequence of output embeddings; and
process the sequence of output embeddings to generate the network output for the machine learning task.

2. The system of claim 1, wherein the input embeddings comprise uni-gram embeddings.

3. The system of claim 1, wherein the latent n-gram representation comprises a latent bi-gram representation.

4. The system of claim 1, wherein the latent n-gram representation comprises a latent tri-gram representation or another latent higher order n-gram representation.

5. The system of claim 1, wherein generating the sequence of output embeddings comprises:
applying respective layer normalizations to the sequence of input embeddings and to the latent n-gram representation of the sequence of input embeddings for each head; and
determining a concatenation of the layer normalized sequence of input embeddings and the layer normalized latent n-gram representation of the sequence of input embeddings for each head.

6. The system of claim 1, wherein the learned product quantization codebook has k cluster indices that each map to a respective code word, and wherein generating the discrete latent representation of the sequence of input embeddings for each head comprises, at each of the plurality of input embedding positions:
selecting a code word from among all code words in the learned product quantization codebook that has a least distance from the input embedding at the input embedding position; and
assigning the input embedding to the cluster index that maps to the selected code word.

7. The system of claim 1, wherein a total number of the plurality of n-gram indices is $k^n$, and wherein assigning to each of the plurality of input embedding positions the respective n-gram index comprises:
determining a combination of the corresponding cluster index at the input embedding position and a respective cluster index at each of n preceding input embedding positions multiplied by k.

8. The system of claim 1, wherein generating the latent n-gram representation of the sequence of input embeddings comprises generating a hash value for each of the plurality of input embedding positions by using universal hashing techniques.

9. The system of claim 8, wherein generating the latent n-gram representation of the sequence of input embeddings at each head comprises, at each of the plurality of input embedding positions:
evaluating a hash function in form of ((rb+s) mod p) mod v, here p is a randomly selected prime number greater than $k^2$, r is randomly selected from $\{1, \ldots, p-1\}$, s is randomly selected from $\{0, \ldots, p-2\}$, v is a size of a vocabulary of the n-gram embedding hash table, and b is the n-gram index at the input embedding position.

10. The system of claim 1, wherein the n-gram embedding has a larger dimension than the input embedding.

11. The system of claim 1, wherein the output neural network comprises one or more attention neural network layers that are each configured to:
apply an attention mechanism to an attention layer input derived from the sequence of output embeddings to generate an attention layer output for the attention neural network layer.

12. One or more non-transitory computer-readable storage media storing instructions that when executed by one or more computers cause the one or more computers to implement:
a neural network configured to perform a machine learning task on a network input to generate a network output, the neural network comprising an N-grammer layer and an output neural network, the N-grammer layer configured to:
at each of one or more heads:
receive a sequence of input embeddings derived from the network input that includes a respective input embedding at each of a plurality of input embedding positions;
generate a discrete latent representation of the sequence of input embeddings by using a learned product quantization codebook having different cluster indices that each map to a respective code word, wherein the discrete latent representation of the sequence of input embeddings comprises, at each of the plurality of input embedding positions, a corresponding cluster index that maps to a closest code word to the input embedding at the input embedding position;
generate a plurality of n-gram indices from the discrete latent representation, comprising assigning to each of the plurality of input embedding positions a respective n-gram index based on the corresponding cluster index at the input embedding position and respective cluster indices at one or more preceding input embedding positions; and
generate a latent n-gram representation of the sequence of input embeddings that includes a respective n-gram embedding at each of the plurality of input embedding positions by using an n-gram embedding hash table and the plurality of n-gram indices; and
generate a sequence of output embeddings by determining a combination of the sequence of input embeddings and the latent n-gram representation of the sequence of input embeddings for each head, and
the output neural network configured to:
receive the sequence of output embeddings; and
process the sequence of output embeddings to generate the network output for the machine learning task.

13. A method performed by one or more computers, the method comprising:
receiving a network input; and
processing the network input using a neural network configured to perform a machine learning task on the network input to generate a network output, the neural network comprising an N-grammer layer and an output neural network, the N-grammer layer configured to,
at each of one or more heads:
receive a sequence of input embeddings derived from the network input that includes a respective input embedding at each of a plurality of input embedding positions;
generate a discrete latent representation of the sequence of input embeddings by using a learned product quantization codebook having different cluster indices that each map to a respective code word, wherein the discrete latent representation of the sequence of input embeddings comprises, at each of the plurality of input embedding positions, a corresponding cluster index that maps to a closest code word to the input embedding at the input embedding position;
generate a plurality of n-gram indices from the discrete latent representation, comprising assigning to each of the plurality of input embedding positions a respective n-gram index based on the corresponding cluster index at the input embedding position and respective cluster indices at one or more preceding input embedding positions; and generate a latent n-gram representation of the sequence of input embeddings that includes a respective n-gram embedding at each of the plurality of input embedding positions by using an n-gram embedding hash table and the plurality of n-gram indices; and generate a sequence of output embeddings by determining a combination of the sequence of input embeddings and the latent n-gram representation of the sequence of input embeddings for each head, and the output neural network configured to:
receive the sequence of output embeddings; and
process the sequence of output embeddings to generate the network output for the machine learning task.

14. The method of claim 13, wherein the input embeddings comprise uni-gram embeddings.

15. The method of claim 13, wherein the latent n-gram representation comprises a latent bi-gram representation.

16. The method of claim 13, wherein the latent n-gram representation comprises a latent tri-gram representation or another latent higher order n-gram representation.

17. The method of claim 13, wherein generating the sequence of output embeddings comprises:
applying respective layer normalizations to the sequence of input embeddings and to the latent n-gram representation of the sequence of input embeddings for each head; and
determining a concatenation of the layer normalized sequence of input embeddings and the layer normalized latent n-gram representation of the sequence of input embeddings for each head.

18. The method of claim 13, wherein the learned product quantization codebook has k cluster indices that each map to a respective code word, and wherein generating the discrete latent representation of the sequence of input embeddings for each head comprises, at each of the plurality of input embedding positions:
selecting a code word from among all code words in the learned product quantization codebook that has a least distance from the input embedding at the input embedding position; and
assigning the input embedding to the cluster index that maps to the selected code word.

19. The method of claim 13, wherein a total number of the plurality of n-gram indices is $k^n$, and wherein assigning to each of the plurality of input embedding positions the respective n-gram index comprises:
determining a combination of the corresponding cluster index at the input embedding position and a respective cluster index at each of n preceding input embedding positions multiplied by k.

20. The method of claim 13, wherein generating the latent n-gram representation of the sequence of input embeddings comprises generating a hash value for each of the plurality of input embedding positions by using universal hashing techniques.

* * * * *